United States Patent [19]

Fuji et al.

[11] Patent Number: 4,906,874

[45] Date of Patent: Mar. 6, 1990

[54] ANALOG SIGNAL SWITCHING DEVICE FOR USE IN AN OPTICAL MEMORY

[75] Inventors: Hiroshi Fuji, Nara; Shigemi Maeda, Yamatokoriyama; Takeshi Yamaguchi, Nara; Kunio Kojima, Nara; Toshihisa Deguchi, Nara; Shigeo Terashima, Tenri, all of Japan

[73] Assignee: Sharp Kabushiki Kaisha, Osaka, Japan

[21] Appl. No.: 299,001

[22] Filed: Jan. 19, 1989

[30] Foreign Application Priority Data

Jan. 22, 1988 [JP] Japan .................................. 63-13196

[51] Int. Cl.$^4$ ...................... H03K 17/16; H03K 17/26
[52] U.S. Cl. .................................. 307/520; 307/542; 328/165; 369/13
[58] Field of Search .................. 307/247.1, 542.1, 542, 307/543, 572, 520; 328/165, 167; 369/1 B, 110, 111, 112, 113

[56] References Cited

U.S. PATENT DOCUMENTS

| | | | |
|---|---|---|---|
| 3,947,697 | 3/1976 | Archer et al. | 307/247.1 |
| 4,311,963 | 1/1982 | Watanabe et al. | 328/165 |
| 4,701,715 | 10/1987 | Amazawa et al. | 307/520 |
| 4,785,252 | 11/1988 | Fuji et al. | 328/167 |
| 4,843,604 | 6/1989 | Fujiwara et al. | 369/13 |

FOREIGN PATENT DOCUMENTS 0174822 3/1986 European Pat. Off. .
0220023 4/1987 European Pat. Off. .
0232867 8/1987 European Pat. Off. .
0246830 11/1987 European Pat. Off. .

OTHER PUBLICATIONS

European Search Report No. EP 89300569.4.

Primary Examiner—John Zazworsky
Attorney, Agent, or Firm—Birch, Stewart, Kolasch & Birch

[57] ABSTRACT

An analog signal switching device for use in an optical memory device having a recording/erasing mode and a mode other than the recording/erasing mode is disclosed. The switching device includes a source for producing a switch control signal which is HIGH during the recording/erasing mode and LOW during the mode other than the recording/erasing mode. An analog switch is provided for receiving a direct input analog signal and a held input signal and for providing as output the direct input signal during the LOW state of the switch control signal, and the held input signal during the HIGH state of the switch control signal by a switching operation. Further provided is a mask signal generator for generating a mask signal which covers a period during the HIGH state of the switch control signal so as to cover a period during the switching operation of the analog switch, and a gate circuit controlled by the mask signal for allowing the direct input analog signal to pass therethrough during the absence of the mask signal and for preventing the held input signal to pass therethrough during the presence of the mask signal. Thus, noise signals produced by the switching operation of the analog switch are eliminated.

7 Claims, 5 Drawing Sheets

ANALOG SIGNAL SWITCHING DEVICE FOR USE IN AN OPTICAL MEMORY

BACKGROUND OF THE INVENTION

1. Field of the Invention

The present invention relates to an analog signal switching device for use in optical memory devices which record, playback, and erase information by irradiating the optical data storage medium with a light beam.

2. Description of the Prior Art

Conventionally, optical memory devices include a magneto-optical memory device which records information on a magneto-optical disk. Formed on the magneto-optical disk use in the magneto-optical memory device is a magnetic anisotropic magnetic thin film with an axis of easy magnetization in a direction perpendicular to the film surface, enabling information to be recorded according to the magnetic orientation in minute ranges.

When recording information on magneto-optical disks of this type, the magnetic thin film is irradiated with a focused laser beam with a diameter of, for example, approximately 1 micrometer. Thus, the temperature of that part of the thin film irradiated by the laser beam rises locally, coercive force drops, and the magnetic orientation of the film becomes more easily changed. At this point, it is possible to record or erase information through optical-thermal-magneto recording by changing the magnetic orientation to the desired orientation, for example, by simultaneously applying an external magnetic field to obtain reversed magnetic orientation.

Furthermore, when information recorded according to the above described manner is played back, the magnetic film is irradiated with a weak laser beam having a strength which will not cause the temperature to rise. Thus, the plane of polarization of the linear polarized light in the transmitted light and reflected light of the laser beam incident upon the magnetic thin film is rotated by the Faraday effect and the Kerr effect. Then, by the wave-detection of the transmitted light and reflected light using an analyzer, and also by converting the light to an electrical signal with an optical sensor, a pulse-type playback signal is obtained.

However, the optical sensor also receives the strong laser beam transmitted and reflected o the magnetic thin film during data recording or erasing. Moreover, because the laser beam emitted during recording or erasing is, as described above, a stronger laser beam when compared with that during playback, the optical sensor outputs an excessively high level signal.

When this excessively high level signal is input to a playback analog circuit connected to the optical sensor, the signal greatly exceeds the dynamic range, thus adversely affecting the subsequent playback operation.

Thus, as shown in FIG. 1, an analog signal switching device 10 has conventionally been used. Specifically, analog signal switching device 10 is so constructed that input terminal 12 is directly connected to terminal 11a on one side of analog switch 11, and input terminal 12 is connected to the other terminal 11b through sample hold circuit 13.

The analog switch 11 is so constructed that terminal 11a is connected to terminal 11c when the switch control signal SCS is low, and when the switch control signal SCS is high, terminal 11b is connected to terminal 11c. Furthermore, sample hold circuit 13 is so arranged as to enter a sampling state and output the signal sent from input terminal 12 unmodified when the switch control signal SCS is low, and when the switch control signal SCS is high, to enter a hold state to hold and output the signal sent from input terminal 12 immediately before the switch control signal SCS became high.

As shown in FIG. 2, by using an analog signal switching device 10 of such a type, when the switch control signal SCS is made high during the input of an excessively high level signal (which is several times the playback signal level), i.e., during information recording or erasing from input terminal 12, analog switch 11 produces from its terminal 11c a signal with the excessively high level signal removed.

Therefore, voltage generator 14 and comparator 15 connected to analog switch 11 operate normally, and a binary converted playback digital signal is output.

However, in the above described analog signal switching device 10, although it is possible to remove the excessively high level signal, a switching noise signal tends to be generated during switching of the analog switch. A noise signal of this type poses the problem that the noise signal often remains as a noise pulse even after the binary converted playback digital signal is generated by voltage generator 14 and comparator 15, thus causing improper operation of digital signal processing circuits, such as a demodulation circuit and a PLL (phase locked loop) circuit, and thus reducing the reliability of the optical memory device.

SUMMARY OF THE INVENTION

The present invention has been developed with a view to substantially solving the above described disadvantages and has for its essential object to provide an improved analog signal switching device for use in optical memory devices in which the switching noise signal can be eliminated.

In accomplishing these and other objects, an analog signal switching device for use in an optical memory device having a recording/erasing mode and a mode other than the recording/erasing mode comprises: means for producing a switch control signal (SCS) which is in a first state (HIGH) during the recording/erasing mode and in a second state (LOW) during the mode other than the recording/erasing mode; an analog switch for receiving first (direct) and second (held) input signals and for producing the first (direct) signal during the second (LOW) state of the switch control signal, and the second (held) signal during the first state (HIGH) of the switch control signal by a switching operation; a mask signal generator for generating a mask signal which covers a period during the first state of the switch control signal so as to cover a period during the switching operation of the analog switch; and a gate means controlled by the mask signal for allowing the first (direct) signal to pass therethrough during the absence of the mask signal and for preventing the second (held) signal to pass therethrough during the presence of the mask signal, whereby noise signals produced by the switching operation of the analog switch are eliminated.

According to the aforementioned construction, when the analog switch switches, the mask signal generator generates a mask signal at least for the period in which a switching noise signal accompanying the switching operation of the analog switch is generated. This mask signal masks the signal output by an analog switch by, for example, a gate circuit, and stops or resets the demodulation circuit or PLL circuit connected to the analog switching device.

Therefore, because it is possible to prevent misoperation of a digital signal processing circuit, etc., caused by the influence of a switching noise signal generated during analog switch switching the reliability of the optical memory device ca be easily improved.

BRIEF DESCRIPTION OF THE DRAWINGS

These and other objects and features of the present invention will become apparent from the following description taken in conjunction with a preferred embodiment thereof with reference to the accompanying drawings which are given by way of illustration only and thus are not limitative of the present invention, and throughout which like parts are designated by like reference numerals, wherein.

DETAILED DESCRIPTION OF THE PREFERRED EMBODIMENTS

Figure 1:
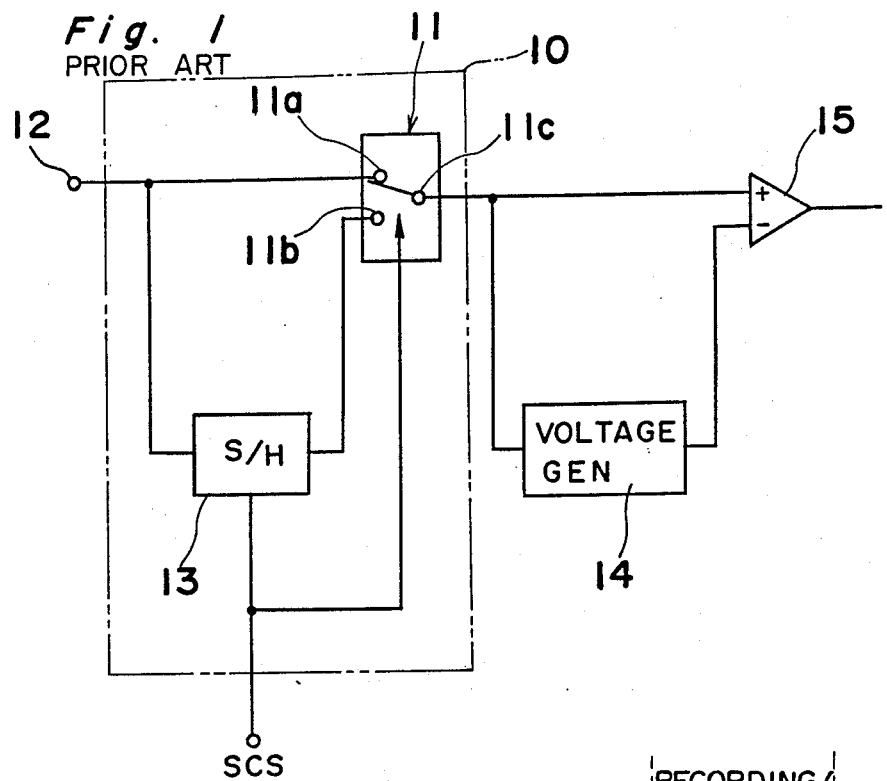
FIG. 1 is a block diagram of a conventional analog switching device.
Figure 2:
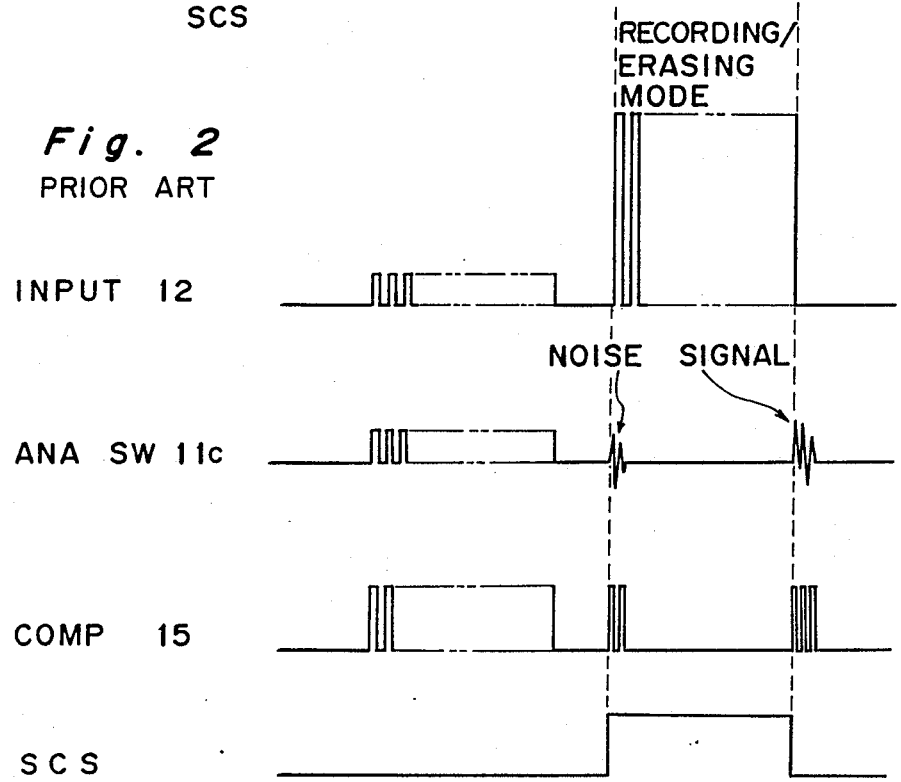
FIG. 2 is a graph showing waveform of signals obtained at various parts of the analog switching device of FIG. 1.
Figure 3:
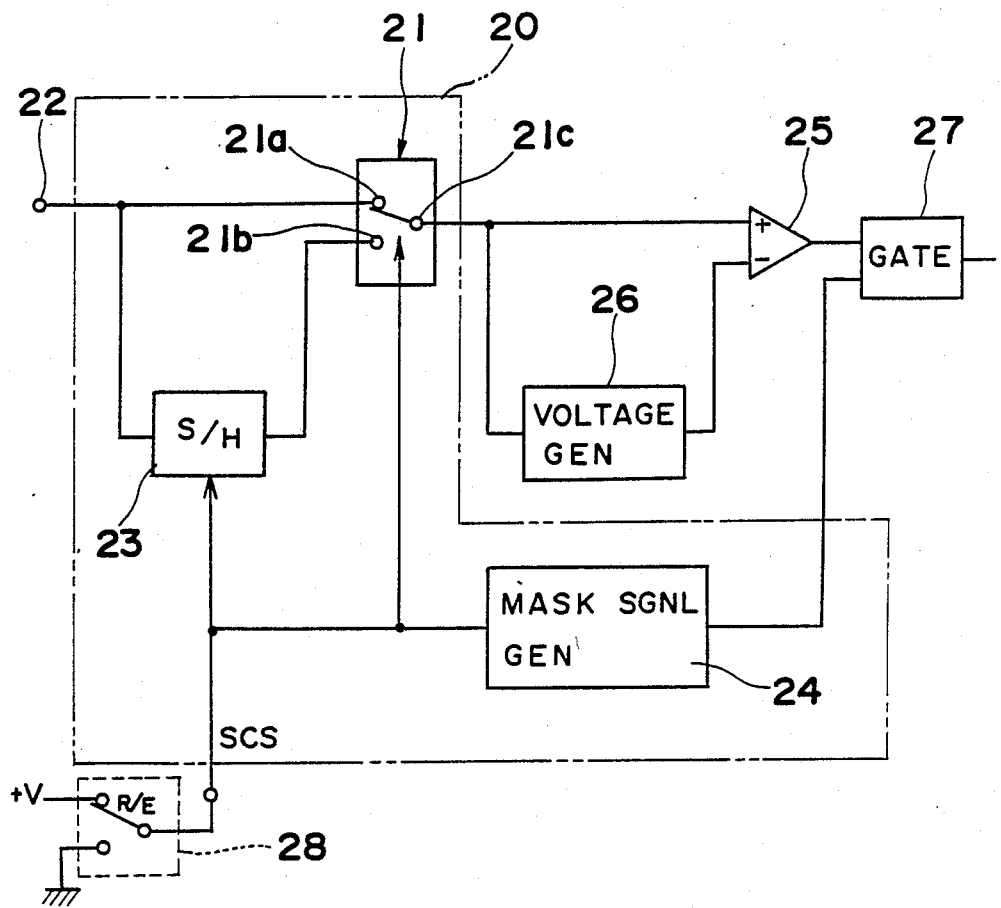
FIG. 3 is a block diagram of an analog switching device according to the present invention.

Referring to FIG. 3, an analog signal switching device 20 for optical memory devices is shown which includes an analog switch 21, a sample hold circuit 23 and a mask signal generator 24. An input terminal 22 is connected directly to terminal 21a of analog switch 21, and also it is connected through sample hold circuit 23 to another terminal 21b of analog switch 21.

Analog switch 21 is operated by a switch control signal SCS produced from a switch control signal generator 28 which operates such that when the optical memory device employing switching device 20 is set to a mode for recording or erasing, generator 28 is set to a position as shown in FIG. 3 so as to produce a HIGH level SCS signal, and when the optical memory device is set to a mode other than the recording and erasing modes, generator 28 is set to an opposite position so as to produce a LOW level SCS signal. During the period in which the signal SCS is at the HIGH level, i.e., during the recording or erasing mode, terminal 21b is connected to terminal 21c and during the period in which the signal SCS is at the LOW level, terminal 21a is connected to terminal 21c.

The switch control signal SCS is also used by sample hold circuit 23 and by mask signal generator 24, as will be described hereinbelow.

Figure 4:
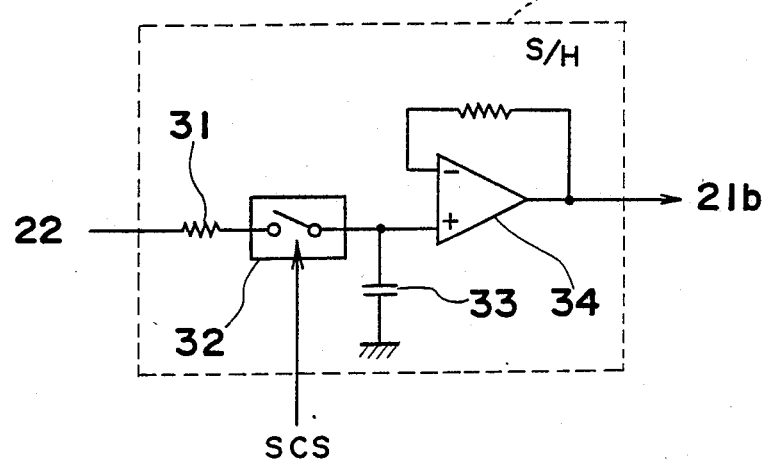
FIG. 4 is a circuit diagram of the sample hold circuit used in the circuit of FIG. 3.

As shown in FIG. 4, sample hold circuit 23 includes an analog switch 32 for receiving the signal from input terminal 22 through a resistor 31, a capacitor 33 for holding the input signal when the analog switch 32 is open, and a buffer 34. The on and off switching of the analog switch 32 is control by LOW and HIGH levels, respectively, of the switch control signal SCS. Thus, when the optical memory device is in the recording or erasing mode, analog switch 32 opens so that capacitor 33 holds a signal immediately before the opening of analog switch 32. Thus, during the recording or erasing mode, sample hold circuit 23 produces a constant signal held in capacitor 33, and during a mode other than the recording and erasing mode, sample hold circuit 23 produces a signal relative to the signal obtained from input terminal 22.

Figure 5:
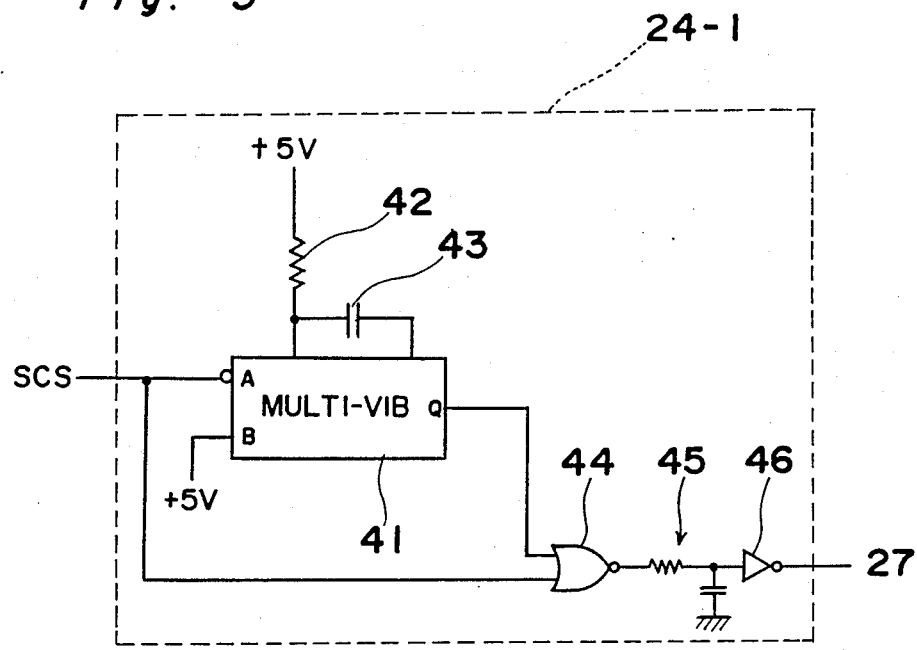
FIGS. 5, 6 and 7 are circuit diagrams showing different embodiments of the mask generation circuit used in the circuit of FIG. 3.

Referring to FIG. 5, a mask signal generator 24-1 according to one preferred embodiment is shown. Mask signal generator 24-1 includes a monostable multivibrator 41, a NOR gate 44, a low pass filter 45 and an inverter 46. One input A of multivibrator 41 receives the signals SC and other input B thereof receives a constant voltage signal. The Q output of multivibrator 41 is connected to one input of NOR gate 44. The other input of NOR gate 44 receives the signal SCS. An output of NOR gate 44 is applied through low pass filter 45 to inverter 46 which produces a mask signal.

Figure 9:
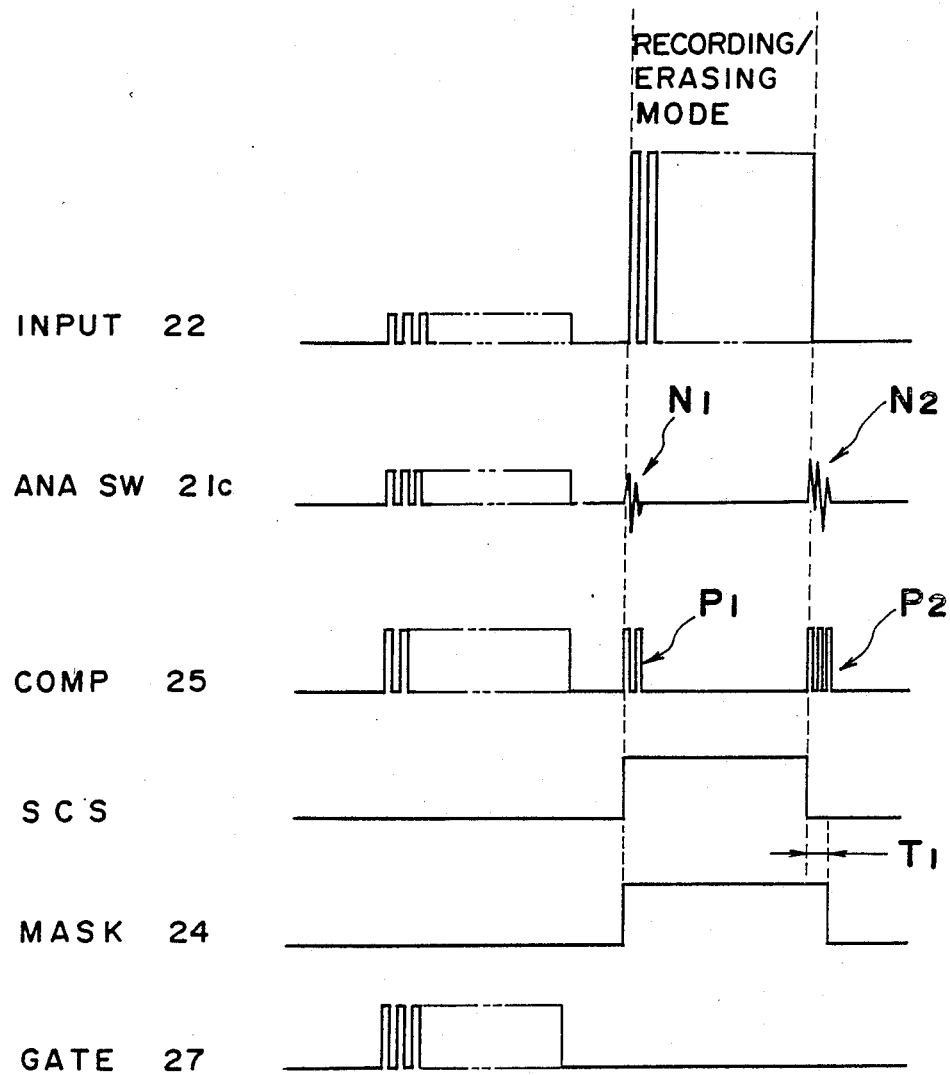
FIG. 9 is a graph showing waveforms of signals obtained at various parts of the analog switching device of FIG. 1.

Mask signal generator 24-1 operates such that in response to the leading edge of switch control signal SCS, NOR gate 44 produces a LOW level signal which is filtered in low pass filter 45 and inverted to a HIGH level signal by inverter 46. Thereafter, in response to the trailing edge of switch control signal SCS, multivibrator 41 is activated to produce a pulse having pulse width T1 which is determined by resistor 42 and capacitor 43 coupled to the multivibrator 41. The pulse produced from multivibrator 41 is applied to NOR gate 44. Thus, following the LOW level signal produced by the switch control signal SCS, NOR gate 44 continuously produces a LOW level signal for another time T1 by the pulse from multivibrator 41. Although some overshoot or preshoot ripples may appear at the trailing edge and/or leading edge of the switch control signal SCS, such ripples can be eliminated by low pass filter 45. Thus, inverter 46 produces a HIGH level signal, which is used as a mask signal, that begins in response to the leading edge of the switch control signal SCS and continues for an extra time T1 after the trailing edge of the signal SCS, as shown in FIG. 9.

Figure 6:
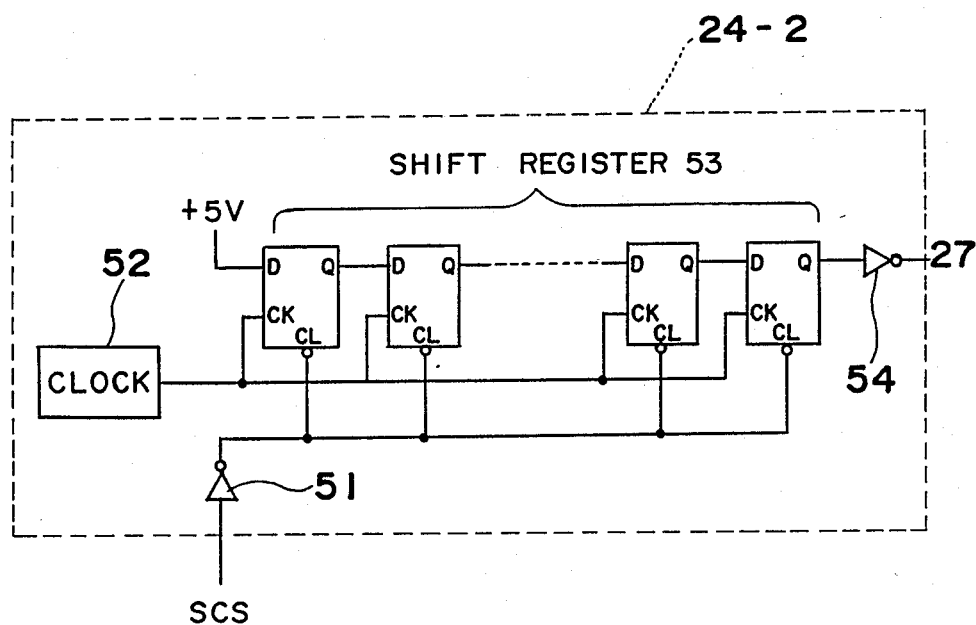

Referring to FIG. 6 a mask signal generator 24-2 according to another preferred embodiment is shown. Mask signal generator 24-2 includes an inverter 51 for receiving the switch control signal SCS, a clock generator 52, an N-bit shift register 53 defined by a plurality of flip-flops, and an inverter 54.

Mask signal generator 24-2 operates such that in response to the leading edge of switch control signal SCS, inverter 51 produces a LOW level signal which clears N-bit shift register 53. Shift register 53 is maintained in the cleared condition during the LOW level signal from inverter 51. Thus during the LOW level signal from inverter 51, i.e., when signal SCS is HIGH, the last flip-flop, as well as other flip-flops, in shift register 53 produces a LOW level signal from its Q terminal, and a LOW level signal from the output terminal Q of the last flip-flop is applied to inverter 54. Thereafter, when switch control signal SCS is changed to LOW, inverter 51 produces a HIGH level signal for activating the shift register 53. Thus, in response to each clock from clock generator 52, the LOW level signal carried in each flop-flop are shifted towards inverter 54 and, at the same time, a HIGH level signal applied to the input terminal D of the shift register is sequentially shifted towards inverter 54. Thus, even after the change of switch control signal SCS from HIGH to LOW, the last flip-flop in shift register 53 continues to produce a LOW level signal for another time T1, i.e., until the HIGH level signal from the input terminal D of the shift register 53 is shifted to the output terminal Q. Accordingly, inverter 54 produces a HIGH level signal, which is used as a mask signal, that begins in response to the leading edge of the switch control signal SCS and continues for extra time T1 after the trailing edge of the signal SCS, as shown in FIG. 9.

Figure 7:
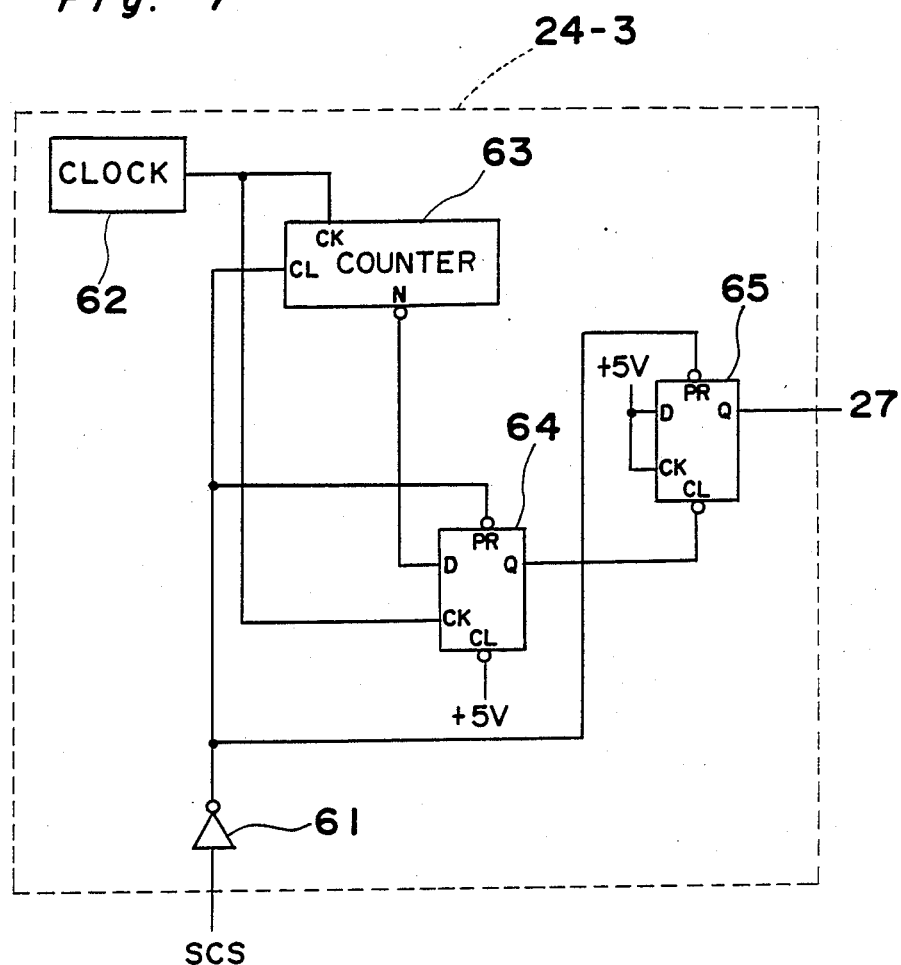

Referring to FIG. 7 a mask signal generator 24-3 according to a further preferred embodiment is shown. Mask signal generator 24-3 includes an inverter 61 for receiving the switch control signal SCS, a clock generator 62, an N-bit counter 63, and flip-flops 64 and 65.

Mask signal generator 24-3 operates such that in response to the leading edge of switch control signal SCS, inverter 61 produces a LOW level signal which clears N-bit counter 63 and, at the same time, presets flip-flops 64 and 65. Thus, the Q terminals of flip-flops 64 and 65 produce a HIGH level signal. Thereafter, when switch control signal SCS is changed to LOW, inverter 61 produces a HIGH level signal for activating the counter 63 to start counting clock pulses from from clock generator 62. When counter 63 counts N clock pulses to count time T1, it produces a negative going pulse to the D terminal of flip-flop 64, and in turn, the Q terminal of flip-flop 64 produces a negative going pulse for clearing flip-flop 65. Thus, flip-flop 65 now changes its output from HIGH to LOW. Thus, even after the change of switch control signal SCS from HIGH to LOW, flip-flop 65 continues to produce from its Q terminal a HIGH level signal for another time T1, i.e., until counter 63 counts N clock pulses. Accordingly, flip-flop 65 produces from its Q terminal a HIGH level signal, which is used as a mask signal, that begins in response to the leading edge of the switch control signal SCS and continues for an extra time T1 after the trailing edge of the signal SCS, as shown in FIG. 9.

In general, mask signal generator 24 generates a mask signal when the switch control signal SCS is HIGH and for the period until a specified time T1 passes after the signal SCS becomes low, specifically, at least for the period during which switching noise signal caused by the switching operation of analog switch 21 is generated.

Figure 8:
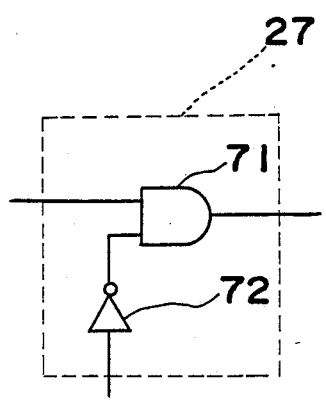
FIG. 8 is a circuit diagram of the gate circuit used in the circuit of FIG. 3.

Referring back to FIG. 3, terminal 21c of analog switch 21 is connected to a non-inverting input of comparator 25, and is also connected through voltage generator 26 to an inverting input of comparator 25. Output signals from comparator 25 and mask signal generator 24 are applied to a gate circuit 27 defined, as shown in FIG. 8, by an AND gate 71 and an inverter 72.

In operation, during a mode other than the recording/erasing mode, the playback analog signal applied to input terminal 22 is relatively small, as shown in FIG. 9, when compared with the analog signal applied to input terminal 22 during the recording/erasing mode. Thus, during a mode other than the recording/erasing mode, the switch control signal SCS is maintained LOW, so that analog switch 21 is switched in the position shown in FIG. 3 to connect terminals 21a and 21c. In this case, mask signal generator 24 produces a LOW level signal to open the gate circuit 27 to permit the output signal from comparator 25 to pass through the gate circuit 27.

Then, when the mode is changed to the recording/erasing mode, the analog signal applied to input terminal 22 is several times greater than that applied during the mode other than the recording/erasing mode, as shown in FIG. 9. During the recording/erasing mode, the switch control signal SCS is made HIGH, so that analog switch 21 is switched to connect terminals 21b and 21c and, also so that sample hold circuit 23 holds an analog signal obtained immediately before the change of switch control signal SCS to HIGH. Thus, analog switch 21 continues to produce a reasonable level analog signal as that obtained during the mode other than the recording/erasing mode.

Although the signal output from terminal 21c of analog switch 21 is one from which a signal of excessively high level has been removed, switching noise signals N1 and N2 generated when analog switch 21 switches are present. Then, the signal containing switching noise signals N1 and N2 is compared with the output signal of voltage generator 26 by comparator 25 to produce a binary signal which is used as a digital signal. At this point, noise pulses P1 and P2 based on the switching noise signals N1 and N2 are present in the digital signal. More specifically, in response to the leading edge and the trailing edge of the HIGH level switch control signal SCS, noise signals N1 and N2 shown in FIG. 9 appear at the output of analog switch 21, which results in unwanted noise pulses P1 and P2 produced from comparator 25.

Here, even if a peak detection method, or the like, is used in place of the method using comparator 25 and voltage generator 26 as a method of binary converting the analog signal to a digital signal, noise pulses P1 and P2 could still be present in the digital signal.

Furthermore, in response to switch control signal SCS, mask signal generator 24 produces a HIGH level mask signal which lasts longer by time T1 than the HIGH level switch control signal SCS, as shown in FIG. 9. In other words, mask signal generator 24 outputs a high mask signal when the switch control signal SCS is high and for the period until a specified time T1 passes after the signal becomes low, specifically, for the period until time T1 passes after the terminal connected to terminal 21c of analog witch 21 switches from terminal 21a to terminal 21b and then returns to terminal 21a again.

While this mask signal is high, gate circuit 27 closes to prevent the signal output from comparator 25 to pass therethrough. Accordingly, in the output signal from gate circuit 27, noise pulses P1 and P2 are removed, and only an appropriate digital signal is output from gate circuit 27. Therefore, misoperation of a digital signal processing circuit, etc., due to the influence of switching noise signals N1 and N2 generated during switching of analog switch 21 is easily removed.

It is to be noted that according to a preferred embodiment of the present invention, a case in which the output signal of comparator 25 based on the mask signal output from mask signal generator 24 is masked using a gate circuit 27 has been described, but the present invention shall not be limited to this, and it is also possible to prevent misoperation by, for example, stopping or resetting a digital signal processing circuit for the period in which switching noise signals N1 and N2 are generated by using a mask signal output from mask signal generator 24 as a control signal of a digital signal processing circuit such as a demodulation circuit or PLL circuit (phase locked loop circuit) connected to analog signal switching device 20.

Furthermore, according to the present invention, a particularly significant effect is obtained when preventing the effects of a noise signal generated when switching a signal with an analog switch to remove excessively high level playback analog signals in the aforementioned manner, but the effect is not limited to this, and a similar effect can also be obtained when switching multiple input analog signals.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A signal switching device for use in an optical memory device comprising:
   an analog switch for receiving a plurality of input signals and for producing a selected signal which is one selected from said plurality of input signals by a switching operation;
   a mask signal generator for generating a mask signal which is present during the switching operation of said analog switch; and
   a gate means for allowing said selected signal to pass therethrough during the absence of said mask signal and for preventing said selected signal to pass therethrough during the presence of said mask signal, whereby noise signals produced by the switching operation of said analog switch are eliminated.

2. A signal switching device for use in an optical memory device having a recording/erasing mode and a mode other than said recording/erasing mode comprising:
   means for producing a switch control signal which is in a first state during said recording/erasing mode and in a second state during said mode other than said recording/erasing mode;
   an analog switch for receiving first and second input signals and for producing as an output said first input signal during the second state of said switch control signal, and said second input signal during the first state of said switch control signal by a switching operation;
   a mask signal generator for generating a mask signal which covers a period during the first state of said switch control signal so as to cover a period during the switching operation of said analog switch; and
   a gate means controlled by said mask signal for allowing said first input signal to pass therethrough during the absence of said mask signal and for preventing said second input signal to pass therethrough during the presence of said mask signal, whereby noise signals produced by the switching operation of said analog switch are eliminated.

3. An analog signal switching device for use in an optical memory device having a recording/erasing mode and a mode other than said recording/erasing mode comprising:
   means for producing a switch control signal which is in a first state during said recording/erasing mode and in a second state during said mode other than said recording/erasing mode;
   sample hold circuit means for holding an input analog signal during the second state of said switch control signal;
   an analog switch for receiving said input analog signal and said held input analog signal from said sample hold circuit means and for producing as an output said input analog signal during the second stage of said switch control signal, and said held input analog signal during the first state of said switch control signal by a switching operation;
   a mask signal generator for generating a mask signal which covers a period during the first state of said switch control signal so as to cover a period during the switching operation of said analog switch;
   a digital signal generator for generating a digital signal converted from said analog signal produced from said analog switch; and
   a gate means controlled by said mask signal for allowing a digital signal corresponding to said input analog signal to pass therethrough during the absence of said mask signal and for preventing a digital signal corresponding to said held input analog signal to pass therethrough during the presence of said mask signal, whereby noise signals produced by the switching operation of said analog switch are eliminated.

4. An analog signal switching device as claimed in claim 3, wherein said mask signal starts in response to a change from the first to the second state of said switch control signal and ends a predetermined time after a change from the second to the first state of said switch control signal.

5. An analog signal switching device as claimed in claim 4, wherein said mask signal generator comprises a multivibrator for producing a pulse, having a predetermined time width, after the change from second to first state of said switch control signal.

6. An analog signal switching device as claimed in claim 4, wherein said mask signal generator comprises a shift register for shifting a data in a predetermined time after the change from the second to the first state of said switch control signal.

7. An analog signal switching device as claimed in claim 4, wherein said mask signal generator comprises a counter for counting a predetermined time after the change from the second to the first state of said switch control signal.

* * * * *